(12) United States Patent
Dorey

(10) Patent No.: US 7,421,555 B2
(45) Date of Patent: Sep. 2, 2008

(54) SYSTEM, DEVICE, AND METHOD FOR MANAGING FILE SECURITY ATTRIBUTES IN A COMPUTER FILE STORAGE SYSTEM

(75) Inventor: Martin A. Dorey, Slough (GB)

(73) Assignee: BlueArc UK Limited, Bracknell, Berkshire (GB)

( * ) Notice: Subject to any disclaimer, the term of this patent is extended or adjusted under 35 U.S.C. 154(b) by 611 days.

(21) Appl. No.: 10/646,365

(22) Filed: Aug. 22, 2003

(65) Prior Publication Data
US 2005/0044399 A1 Feb. 24, 2005

(51) Int. Cl.
G06F 12/14 (2006.01)
(52) U.S. Cl. ............ 711/164; 713/182; 714/4; 714/38; 714/39
(58) Field of Classification Search ......... 713/182, 713/200–202; 714/38, 39, 47, 4; 711/163, 711/164
See application file for complete search history.

(56) References Cited

U.S. PATENT DOCUMENTS

| | | | |
|---|---|---|---|
| 6,446,129 B1 | 9/2002 | DeForest et al. | 709/230 |
| 6,457,130 B2 * | 9/2002 | Hitz et al. | 713/201 |
| 6,748,380 B2 * | 6/2004 | Poole et al. | 707/9 |
| 6,785,822 B1 * | 8/2004 | Sadhwani-Tully | 713/201 |
| 6,901,509 B1 * | 5/2005 | Kocher | 713/158 |
| 2002/0112045 A1 | 8/2002 | Nirkhe et al. | 709/223 |

OTHER PUBLICATIONS

Authorized officers: Ursula Riepert and R. Apostolescu, International Search Report and the Written Opinion of the International Searching Authority, International Searching Authority, 15 pages, Aug. 12, 2004.
Allison, B. et al., File system Security: Secure Network Data Sharing for NT and UNIX, XP-002306906, Retrieved from the Internet on Nov. 22, 2004, www.usenix.org/publications/library/proceedings/lisa-nt98/full_papers/allisonj/allison.pdf,13 pages, Aug. 5, 1998.

* cited by examiner

Primary Examiner—Tonia L. M. Dollinger
(74) Attorney, Agent, or Firm—Bromberg & Sunstein LLP (57) ABSTRACT

A system, device, and method for managing file security attributes in a computer file storage system generates a set of Windows file security attributes from a set of UNIX file security attributes. The set of Windows file security attributes includes a UNIX-specific SID for a UNIX name that could not be translated into a Windows name. The set of Windows file security attributes also includes a set of Windows file permissions derived from a set of UNIX file permissions.

31 Claims, 8 Drawing Sheets

SYSTEM, DEVICE, AND METHOD FOR MANAGING FILE SECURITY ATTRIBUTES IN A COMPUTER FILE STORAGE SYSTEM

FIELD OF THE INVENTION

The present invention relates generally to computer file storage systems, and, more particularly, to managing file security attributes in a computer file storage system.

BACKGROUND OF THE INVENTION

In today's information age, computer file storage systems are frequently used to store large amounts of information. A computer file storage system typically includes one or more file servers that manage files in various types of storage media and provide various services to clients. One service provided by the file server is file security. Specifically, each file is associated with a set of file security attributes that specify such things as file access privileges for a principal who is the owner of the file (referred to hereinafter as owner access privileges), file access privileges for principals who are members of a predefined group (referred to hereinafter as group access privileges), and file access privileges for principals who are neither the owner of the file nor members of the group (referred to hereinafter as default or everyone privileges).

There are generally two security models in widespread use, namely a UNIX security model and a Windows or NT security model. Each model provides for a set of file security attributes that are stored along with the file. UNIX file security attributes include, among other things, an owner identifier, a group identifier, and a set of file access privileges defining the owner access privileges, the group access privileges, and the default (everyone) access privileges. Windows file security attributes are generally more flexible than the UNIX file security attributes, but allow similar types of privileges to be defined. For convenience, a file that is stored along with a set of UNIX file security attributes is referred to hereinafter as a UNIX-secured file, while a file that is stored along with a set of Windows file security attributes is referred to hereinafter as a Windows-secured file.

Although the two security models define similar types of file security attributes, the two security models differ both in the way the set of file security attributes is stored and the way in which the file access privileges are defined.

In the UNIX security model, owner and group identifiers are integer values (e.g., 32-bit), and the file access privileges include nine permissions, specifically a read permission, a write permission, and an execute permission for each of the owner, group, and default access privileges (often shown as rwxrwxrwx, where the left-most "rwx" indicates the owner read, write, and execute permissions, the next "rwx" indicates the group read, write, and execute permissions, and the right-most "rwx" indicates the default read, write, and execute permissions).

In the Windows security model, file security attributes are defined using a number of security identifiers. A security identifier (SID) is a unique value of variable length that is used to identify a security principal or security group in Windows 2000 and Microsoft Windows NT. Every Windows account is associated with a SID. Although SIDs are stored as binary data, they can be represented as strings of the form:

S-1-X(-Y)

where X is an authority identifier and Y is a list of zero or more qualifiers separated by dashes. Well-known SIDs are a group of SIDs that identify generic users or generic groups. The well-known SIDs utilize six predefined authority identifiers, where authority identifier (0) represents a null authority, authority identifier (1) represents a world authority, authority identifier (2) represents a local authority, authority identifier (3) represents a creator authority, authority identifier (4) represents a non-unique authority, and authority identifier (5) represents an NT authority. The well-known SIDs remain constant across all operating systems. The file access privileges are defined by an access control list (ACL) having one or more access control elements (ACE). There are typically up to five ACEs in an ACL specifically for defining permissions denied the owner, permissions granted the owner, permissions denied the group, permissions granted the group, and permissions granted everyone else.

In some computer file storage systems, files are stored using both UNIX and Windows security models, and both UNIX and Windows clients can access the files. In such a computer file storage system, problems arise when a Windows client attempts to read or modify file security attributes for a UNIX-secured file and the file server is unable to map the UNIX owner identifier and/or the UNIX group identifier to a corresponding Windows identifier. For example, when a Windows client sends a request to the file server to read file security attributes of a UNIX-secured file, the Windows client expects to receive from the file server a security descriptor (SD) including, among other things, an owner SID including a Windows owner identifier, a group SID including a Windows group identifier, and an ACL having one or more ACEs defining the file permissions. If the file server is unable to map the UNIX owner identifier and/or the UNIX group identifier associated with the file to a corresponding Windows identifier, then the file server is unable to generate the proper SID for the SD. The file server is also unable to effectively map UNIX file permissions to Windows file permissions because the file server is unable to determine whether or not the requester is the owner of the file or a member of group associated with the file. In this situation, the file server may reject the request outright, in which case the Windows client receives no file security attribute information, or the file server may return a SD omitting the unmappable owner and/or group and including an ACL reporting the most restrictive file permissions represented in the UNIX file permissions, in which case some of the file security attribute information may be omitted.

SUMMARY OF THE INVENTION

In accordance with one aspect of the invention, management of file security attributes in a computer file storage system involves generating a set of Windows file security attributes from a set of UNIX file security attributes. The set of Windows file security attributes includes a UNIX-specific SID for a UNIX name that could not be translated into a Windows name. The set of Windows file security attributes also includes a set of Windows file permissions derived from a set of UNIX file permissions.

In accordance with another aspect of the invention, a method for managing file security attributes by a file server in a computer file storage system involves receiving a first request from a Windows client relating to a file stored in the computer file storage system, determining that the file is a UNIX-secured file, retrieving a set of UNIX file security attributes associated with the file, the set of UNIX file security attributes including at least a UNIX owner identifier and a UNIX group identifier, and generating a set of Windows file security attributes from the set of UNIX file security attributes. The set of Windows file security attributes includes at least an owner SID derived from the UNIX owner identifier and a group SID derived from the UNIX group identifier. At least one of the owner SID and the group SID is a UNIX-specific SID including at least one UNIX-specific indicator and the corresponding UNIX identifier. The method typically also includes transmitting the set of Windows file security attributes to the Windows client in a response to the first request.

The Windows client may transmit a request to the file server to translate the UNIX-specific SID, in which case the method may also involve translating the UNIX-specific SID into a text string and transmitting the text string to the Windows client. The text string typically includes a UNIX-specific indicator to aid a user in identifying a configuration problem in the computer file storage system, particularly with mappings between UNIX names and Windows names.

The set of UNIX file security attributes typically includes a set of UNIX file permissions, and generating the set of Windows file security attributes from the set of UNIX file security attributes typically involves generating a set of Windows file permissions from the set of UNIX file permissions. The method for generating the set of Windows file permissions may involve translating the set of UNIX file permissions into a set of Windows file permissions, the set of Windows file permissions defining owner permissions, group permissions, and everyone permissions; removing any rights from the owner that the owner would be granted implicitly but are not granted to either the group or to everyone; adding any rights that need to be explicitly denied to the owner and to the group; producing a set of access control elements ordered hierarchically; and removing any redundant permissions from the access control elements. Modifications to file security attributes received from a Windows client may be applied to the set of Windows file security attributes and written to the storage device. The Windows file security attributes may also be used to provide file access for Windows clients.

In accordance with another aspect of the invention, an apparatus for managing file security attributes in a computer file storage system includes a network interface for communicating with clients over a communication network, a storage interface for communicating with a file storage device, and file security logic operating between the network interface and the storage interface for managing file security attributes. The file security logic includes logic for generating a set of Windows file security attributes from the set of UNIX file security attributes. The set of Windows file security attributes includes at least an owner SID derived from the UNIX owner identifier and a group SID derived from the UNIX group identifier. At least one of the owner SID and the group SID includes at least one UNIX-specific indicator and the corresponding UNIX identifier. The file security logic typically also includes logic for mapping each UNIX identifier to a corresponding Windows identifier and logic for generating, for each UNIX identifier that cannot be mapped to a corresponding Windows identifier, the SID including the at least one UNIX-specific indicator and the corresponding UNIX identifier. The apparatus may include a table mapping UNIX names to Windows names, in which case the file security logic typically determines a UNIX name corresponding to the UNIX identifier and searches the table for a Windows name corresponding to the UNIX name for mapping each UNIX identifier to a corresponding Windows identifier. The apparatus may include a cache mapping UNIX identifiers to UNIX names, in which case the file security logic typically searches the cache for a UNIX name corresponding to the UNIX identifier for determining a UNIX name corresponding to the UNIX identifier. Alternatively, the file security logic may send the UNIX identifier over a communication link to a NIS server for determining a UNIX name corresponding to the UNIX identifier. The file security logic typically includes logic for translating a UNIX-specific SID into a text string. The file security logic typically includes logic for generating a set of Windows file permissions from the set of UNIX file permissions. The file security logic typically includes logic for modifying the set of Windows file permissions based on changes requested by a Windows client and for writing the modified set of Windows file permissions to the storage device.

In accordance with another aspect of the invention, a method for generating a set of Windows file permissions from a set of UNIX file permissions involves translating the set of UNIX file permissions into a set of Windows file permissions, the set of Windows file permissions defining owner permissions, group permissions, and everyone permissions; removing any rights from the owner that the owner would be granted implicitly but are not granted to either the group or to everyone; adding any rights that need to be explicitly denied to the owner and to the group; producing a set of access control elements ordered hierarchically; and removing any redundant permissions from the access control elements.

In accordance with another embodiment of the invention, a security identifier (SID) including at least one UNIX-specific indicator and a corresponding UNIX identifier is translated into a text string. The text string typically includes a representation of the UNIX identifier from the SID. Translating the SID into a text string may involve transmitting a request to a translator over a communication network, the request including at least the UNIX identifier.

DETAILED DESCRIPTION OF A PREFERRED EMBODIMENT

In embodiments of the present invention, when a UNIX identifier cannot be mapped to a corresponding Windows identifier, a UNIX-specific SID is generated. The UNIX-specific SID preferably includes at least one UNIX-specific indicator and the UNIX identifier. UNIX-specific SIDs can be used in a number of ways to help manage file security attributes.

The UNIX-specific SID is preferably of the form:

S-1-X-Y-Z where X is a UNIX-specific authority identifier having a predetermined value other than one of the well-known authority identifier values zero through five, Z is the UNIX identifier, and Y is an owner/group indicator having a first value (preferably 0) for indicating that the UNIX identifier Z is the UNIX owner identifier and a second value (preferably 1) for indicating that the UNIX identifier Z is the UNIX group identifier. For example, an embodiment of the present invention may use the value X=77 for the UNIX-specific authority identifier, the value Y=0 for indicating that the UNIX identifier Z is the UNIX owner identifier, and the value Y=1 for indicating that the UNIX identifier Z is the UNIX group identifier. Such an embodiment might generate the UNIX-specific SID "S-1-77-0-500" for UNIX owner identifier 500 and might generate the UNIX-specific SID "S-1-77-1-501" for UNIX group identifier 501. The UNIX-specific SID is not limited to this form or contents, and some alternative forms are described below.

Figure 1:
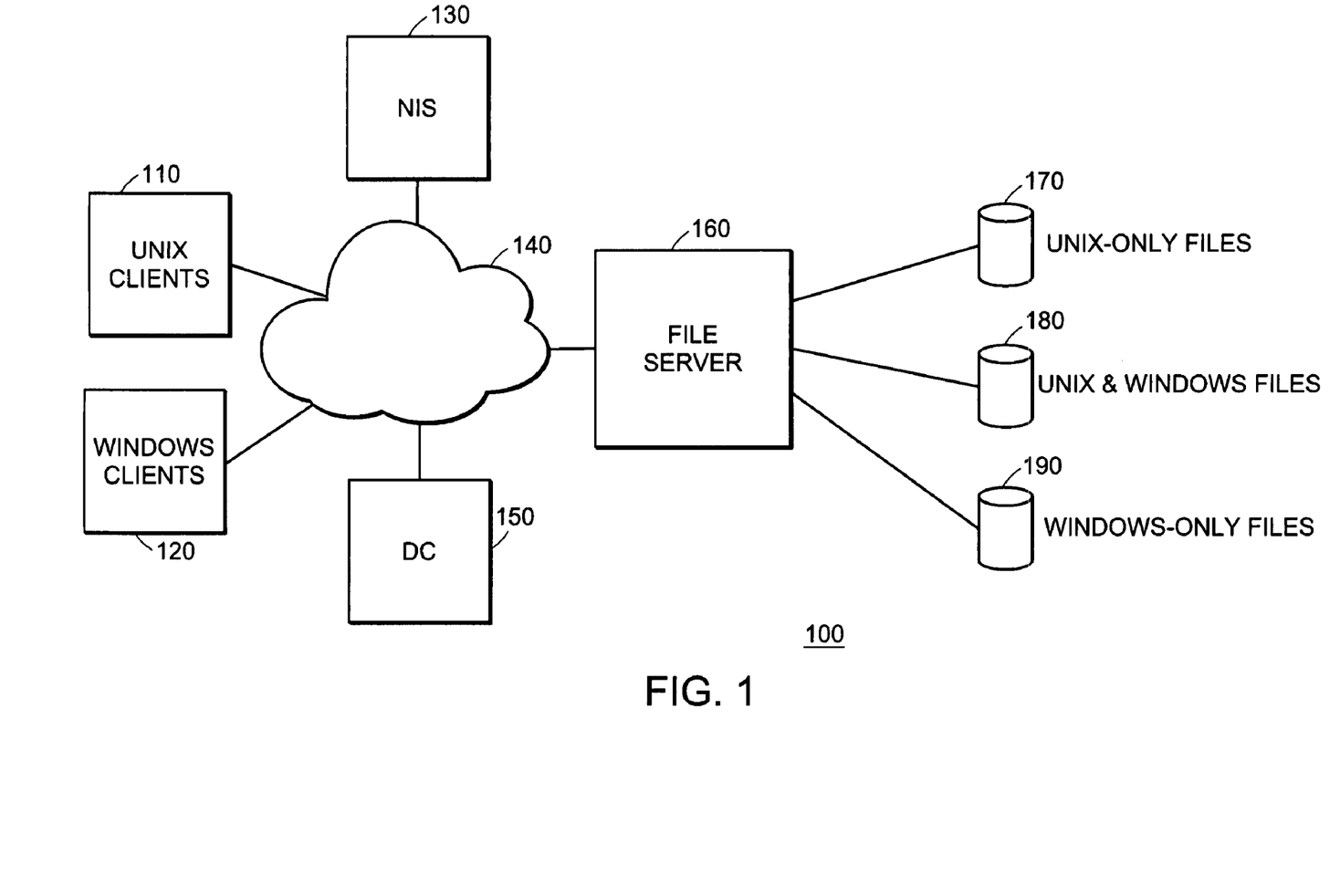
FIG. 1 is a schematic diagram of an exemplary computer file storage system in accordance with an embodiment of the present invention.

Various exemplary embodiments of the present invention are described below with reference to an exemplary computer file storage system 100 shown in FIG. 1. Among other things, the computer file storage system 100 includes a file server 160 that manages various storage devices 170, 180, and 190. In this example, storage device 170 is used to store UNIX-secured files that are only accessed by UNIX clients 110, storage device 190 is used to store Windows-secured files that are only accessed by Windows clients 120, and storage device 180 is used to store both UNIX-secured and Windows-secured files that can be access by both UNIX clients 110 and Windows clients 120. The UNIX clients 110 and the Windows clients 120 communicate with the file server over a communication network 140, such as an Ethernet LAN. Also connected to the communication network 140 are a NIS server 130 and a Domain Controller (DC) 150. The NIS server 130 is used to translate between UNIX owner/group identifiers and UNIX owner/group names. The DC 150 is used to translate between Windows owner/group identifiers (SIDs) and Windows owner/group names. The UNIX clients 110 and the Windows clients 120 send various requests to the file server 160, such as, for example, to read a file, write a file, execute a file, read file security attributes, or modify file security attributes. The file server 160 services the various requests, interacting as needed with the NIS server 130, the DC 150, and the various storage devices 170, 180, and 190.

When a Windows client 120 sends a request to the file server 160 to access a file stored on the storage device 180 (such as, for example, to create, read, or write the file), the file server 160 needs to determine whether the Windows client 120 has permission for the requested access. The file server 160 retrieves the file security attributes associated with the file from the storage device 180. If the file is a Windows-secured file, then file security attributes will include a Windows owner SID, a Windows group SID, and an ACL with file permissions, and the file server 160 generates a SD as it would for any other Windows-secured file. However, assuming the file is a UNIX-secured file, the file security attributes will include a UNIX owner identifier, a UNIX group identifier, and a set of UNIX file permissions. In this case, the file server 160 generates a Windows owner SID from the UNIX owner identifier, generates a Windows group SID from the UNIX group identifier, and generates a Windows ACL from the UNIX file permissions, as discussed further below. If the Windows client 120 is the owner of the file, then the file server 160 gives the Windows client 120 owner privileges; if the Windows client 120 is a member of the group, then the file server 160 gives the Windows client 120 group privileges; if the Windows client 120 is neither the owner nor a member of the group, then the file server 160 gives the Windows client 120 "everybody" privileges.

When a Windows client 120 sends a request to the file server 160 to read the security attributes for a UNIX-secured file stored in the storage device 180, the file server 160 reads the UNIX file permissions, generates a Windows owner SID from the UNIX owner ID, generates a Windows group SID from the UNIX group ID, and generates a Windows ACL from the UNIX file permissions, as discussed below. The file server 160 generates a SD including the Windows owner SID, the Windows group SID, and the Windows ACL, and sends the SD to the Windows client 120.

Figure 2:
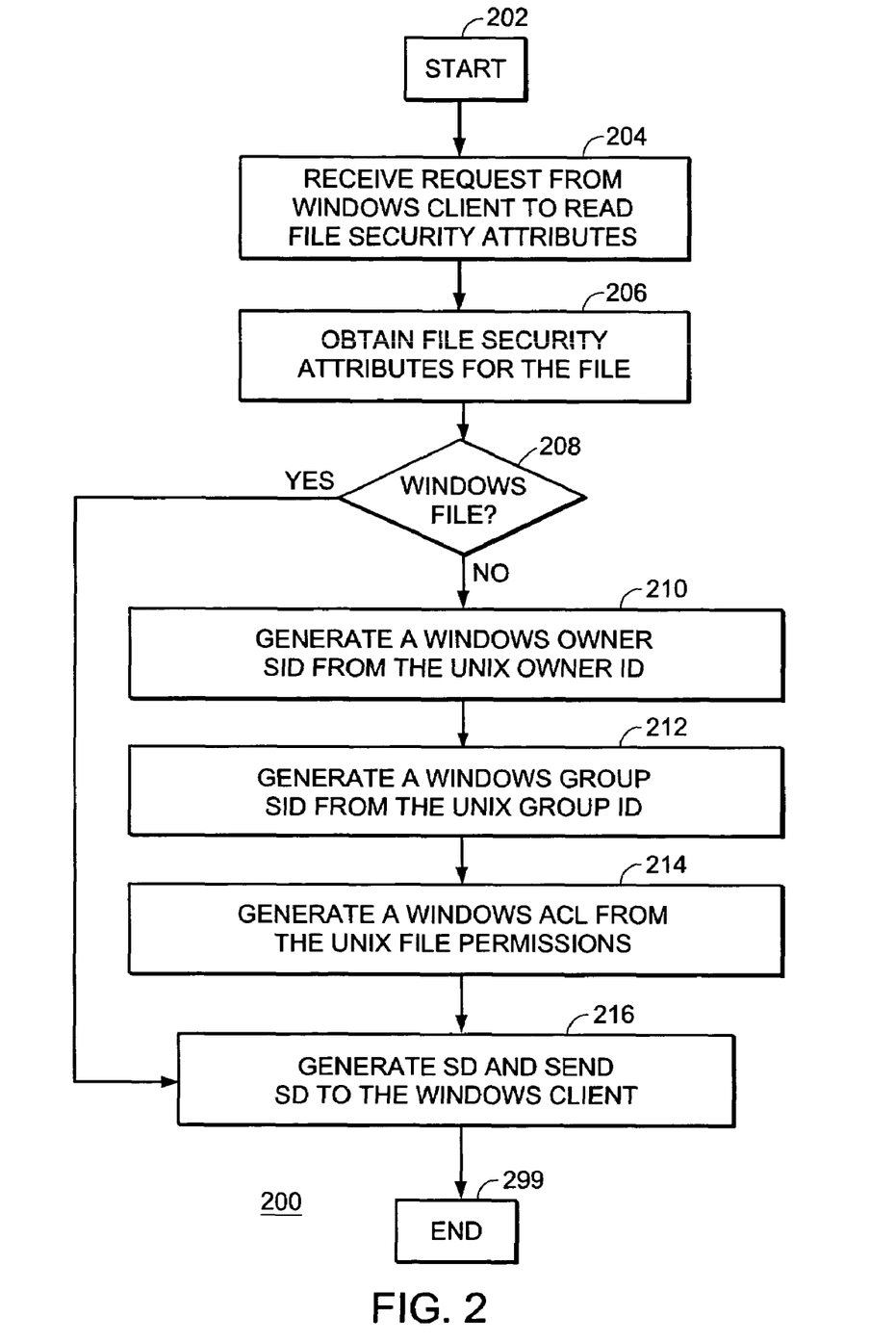
FIG. 2 is a logic flow diagram showing exemplary logic for handling a request to read security attributes received from a Windows client, in accordance with an embodiment of the present invention.

FIG. 2 is a logic flow diagram showing exemplary logic 200 for handling a request to read security attributes received from a Windows client, in accordance with an embodiment of the present invention. Beginning in block 202, and upon receiving a request from a Windows client to read file security attributes in block 204, the logic obtains file security attributes for the file, in block 206. The logic then determines whether the file is a UNIX-secured file or a Windows-secured file, in block 208. If the file is a Windows-secured file (YES in block 208), then the logic proceeds to block 216. If, however, the file is a UNIX-secured file (NO in block 208), then the logic generates a Windows owner SID from the UNIX owner ID in block 210, generates a Windows group SID from the UNIX group ID in block 212, generates a Windows ACL from the UNIX file permissions, in block 214, and proceeds to block 216. In block 216, the logic generates a SD and sends the SD to the requestor. The logic 200 terminates in block 299.

In order to generate the owner and group SIDs from the UNIX owner and group identifiers, the file server 160 attempts to map each of the UNIX identifiers to a corresponding Windows name. This typically involves first mapping the UNIX identifier to a UNIX name, for example, using a locally-maintained cache and/or by contacting the NIS server 130. If the file server 160 is unable to map the UNIX identifier to a UNIX name, then the file server 160 generates a UNIX-specific SID including the UNIX identifier as described above. If the file server 160 is able to map the UNIX identifier to a UNIX name, then the file server 160 attempts to map the UNIX name to a corresponding Windows name. In a preferred embodiment of the invention, the file server 160 maintains a table that maps between UNIX names and Windows names. This table may be provided by an administrator or generated automatically from mapping information obtained from the NIS server 130 and the DC 150. It should be noted that the table may not have a mapping between every UNIX name and every Windows name. It should also be noted that UNIX names and/or Windows names may be added, deleted, or modified over time so that the mapping information in the table may become obsolete over time. If the file server 160 is unable to map the UNIX name to a Windows name, then the file server 160 generates a UNIX-specific SID including the UNIX identifier as described above. If the file server 160 is able to map the UNIX name to a Windows name, then the file server 160 generates the appropriate owner or group SID using the Windows name.

Figure 3:
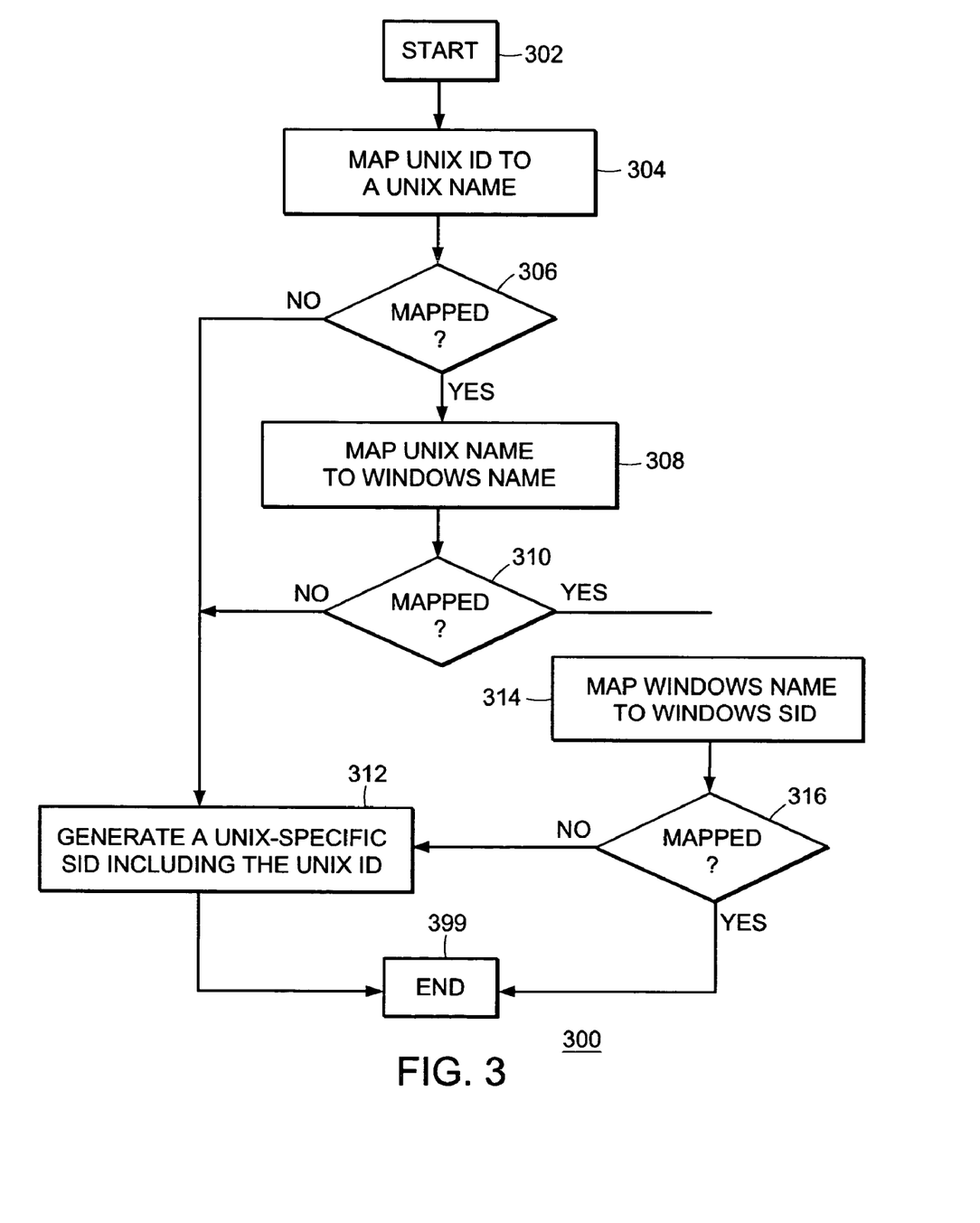
FIG. 3 is a logic flow diagram showing exemplary logic for generating a Windows SID from a UNIX ID, in accordance with an embodiment of the present invention.

FIG. 3 is a logic flow diagram showing exemplary logic 300 for generating a Windows SID from a UNIX ID, in accordance with an embodiment of the present invention. Beginning in block 302, the logic first attempts to map the UNIX ID to a UNIX name, in block 304. This may involve contacting the NIS server 130 to perform the mapping. If the logic is unable to map the UNIX ID to a UNIX name, for example, due to a failure contacting the NIS server 130 or an inability by the NIS server 130 to map the UNIX ID to a UNIX name (NO in block 306), then the logic generates a UNIX-specific SID including the UNIX ID, in block 312. If, however, the logic is able to map the UNIX ID to a UNIX name. (YES in block 306), then the logic attempts to map the UNIX name to a Windows name, in block 308. If the logic is unable to map the UNIX name to a Windows name (NO in block 310), then the logic generates a UNIX-specific SID including the UNIX ID, in block 312. If, however, the logic is able to map the UNIX name to a Windows name (YES in block 310), then the logic attempts to map the Windows name to a Windows SID, in block 314. This may involve contacting the DC 150 to perform the mapping. If the logic is unable to map the Windows name to a Windows SID, for example, due to a failure contacting the DC 150 or an inability by the DC 150 to map the Windows name to a Windows SID (NO in block 316), then the logic generates a UNIX-specific SID including the UNIX ID, in block 312. The logic 300 terminates in block 399.

In order to generate a Windows ACL from the UNIX file permissions, the file server 160 first translates the UNIX file permissions into a set of Windows file permissions. As discussed above, there are three principals, namely the owner, the group, and everyone. The file server 160 determines the rights that are granted to each principal from the corresponding "rwx" triple in the UNIX permissions. In exemplary embodiments of the present invention, "r" corresponds to the Windows FileGenericRead, "w" to the Windows FileGenericWrite, and "x" to the Windows FileGenericExecute. In addition "w" on a directory confers the right to delete its children (the Windows DeleteChild right). All principals also get the Windows rights ReadControl (the right to read the ACL, owner and group) and Synchronize (a right that is generally unimportant for file access but is typically granted for Windows compatibility). The owner also gets the right to change the owner (WriteOwner), the permissions (WriteDACL), and various other attributes (WriteAttributes) (e.g., datestamps, a read-only flag, an archive flag indicating whether the file has changed since a last backup, and flags indicating whether the file is a system file or a hidden file), the last of these being a right that a UNIX owner always has but which is not implicitly granted to a Windows owner.

After translating the UNIX file permissions into a set of Windows file permissions, the file server 160 attempts to simplify the set of Windows file permissions, if possible, in order to produce an ACL that is more coherent for both the user and the Windows client and that also can be processed more efficiently by the Windows client. The file server 160 first removes any rights from the owner that the owner would be granted implicitly but are not granted to either the group or everyone. The file server 160 then determines any rights that need to be explicitly denied to the owner and to the group. Specifically, the owner should be denied any rights that may be granted to either the group or everyone but should not be granted to the owner. By explicitly denying these rights to the owner, the owner will not be given those rights by virtue of the owner's membership in the group or qualification as a member of "everyone." For example, if the owner is not to have read access but either the group or everyone is given read access, then read access must be explicitly denied to the owner. Similarly, the group should be denied any rights that may be granted to everyone but should not be granted to the group. By explicitly denying these rights to the group, the members of the group will not be given those rights by virtue of qualifying as a member of "everyone." For example, if the group is not to have write access but everyone is given write access, then write access must be explicitly denied to the group.

Once the set of Windows file permissions is simplified, the file server 160 typically orders the ACEs as follows:
1) owner deny ACE
2) owner grant ACE
3) group allow ACE
4) group deny ACE
5) everyone allow ACE The ACEs in the ACL are hierarchical starting with the topmost ACE, such that the first ACE that is applicable to a particular file access is used and the remaining ACEs are ignored. For example, if a member of the group is attempting a write to a file, and the group is explicitly denied write access in the "group deny" ACE, then the group member will be prevented from writing to the file even if the permissions in the "everyone allow" ACE permit write access.

The hierarchical nature of the ACEs can allow for further simplifications of the ACEs. For example, it is redundant to explicitly deny rights in a "deny" ACE that are not explicitly granted in a later ACE (e.g., it is redundant to explicitly deny group write access if the permissions in the "everyone allow" ACE do not permit write access). Also, certain rights explicitly granted to the owner or group may be redundant. For example, the group ACEs are redundant if the group and everyone permissions are the same. Also, the owner ACEs are redundant if the "everyone" permissions are the same as the owner permissions, the group is not allowed more access than the owner, and the group is not denied any access that is granted to the owner.

Therefore, after ordering the ACEs, the file server 160 typically removes any ACEs that are redundant. Among other things, this involves analyzing the ACEs in order to identify any redundant permissions and removing those redundant permissions (including removing one or more ACEs if possible). Finally, the file server 160 adds an additional ACE that does not affect permissions directly, but does affect permissions that will be inherited.

Figure 4:
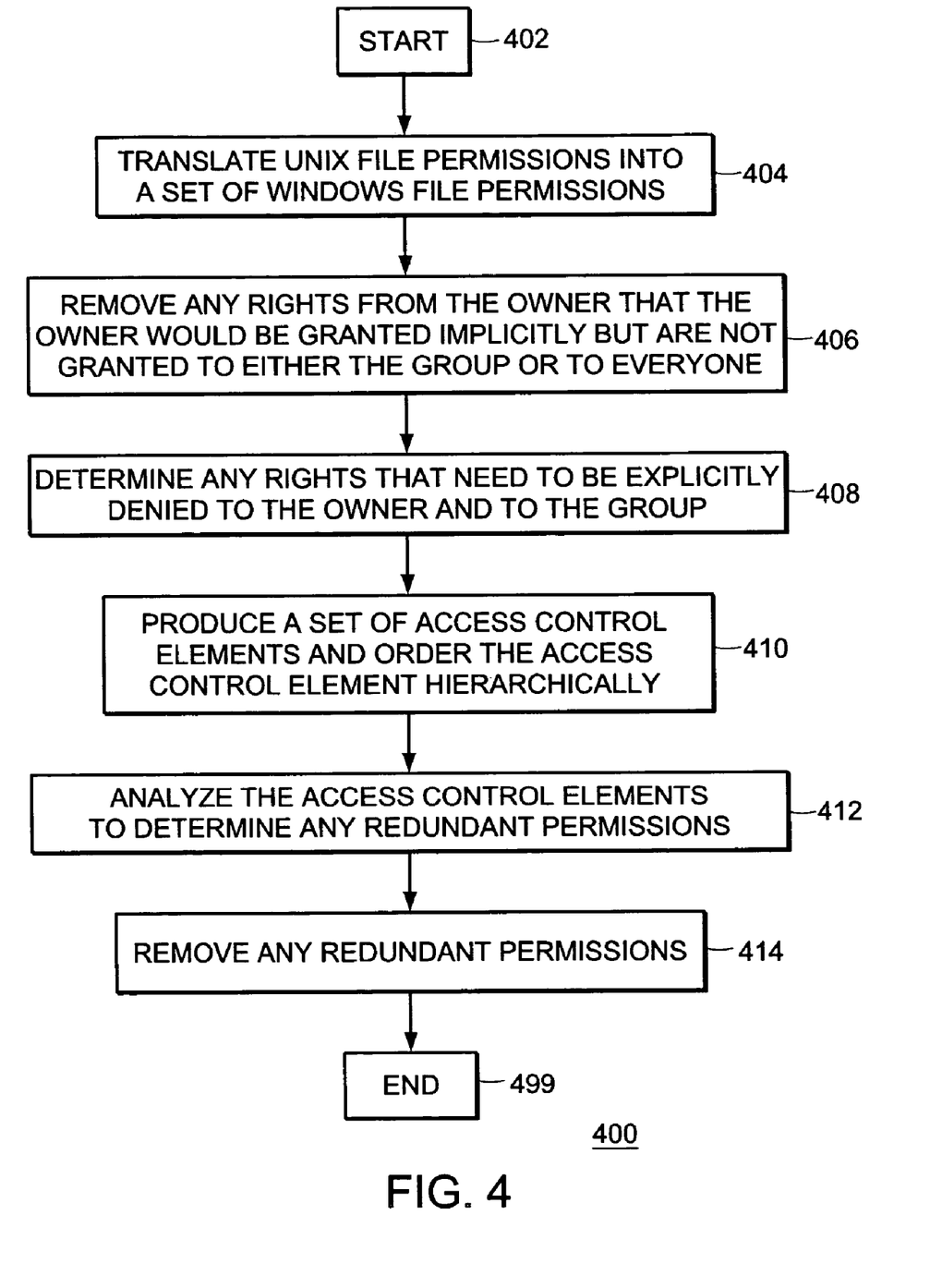
FIG. 4 is a logic flow diagram showing exemplary logic for generating a Windows ACL from the UNIX file permissions in accordance with an embodiment of the present invention.

FIG. 4 is a logic flow diagram showing exemplary logic 400 for generating a Windows ACL from the UNIX file permissions in accordance with an embodiment of the present invention. Beginning in block 402, the logic translates UNIX file permissions into a set of Windows file permissions, in block 404. The logic then removes any rights from the owner that the owner would be granted implicitly but are not granted to either the group or to everyone, in block 406, and determines any rights that need to be explicitly denied to the owner and to the group, in block 408. The logic then produces a set of access control elements and orders the access control element hierarchically, in block 410. The logic then analyzes the access control elements to determine any redundant permissions, in block 412, and removes any redundant permissions, in block 414. The logic 400 ends in block 499.

When the Windows client receives a SD including one or more UNIX-specific SIDs, the Windows client will have each UNIX-specific SID translated into text string representing the Windows name. This typically involves the Windows client sending a request to the file server 160 to translate the UNIX-specific SID, although the Windows client could contact some other server to do the translation provided the other server includes appropriate logic for performing the translation. When the file server 160 receives the translate request from the Windows client, the file server 160 generates an appropriate text string and returns the text string to the Windows client. In a preferred embodiment of the present invention, the text string typically includes the word "UNIX," the word "owner" or "group" (depending on whether the unmappable UNIX ID is the owner ID or the group ID), and the UNIX ID number that could not be mapped to a Windows name, although it should be noted that the text string is not limited to any particular form or content. However, translating the UNIX-specific SID into a text string that clearly indicates the UNIX owner/group status and the UNIX ID will help an administrator identify and fix the mapping problem.

Figure 5:
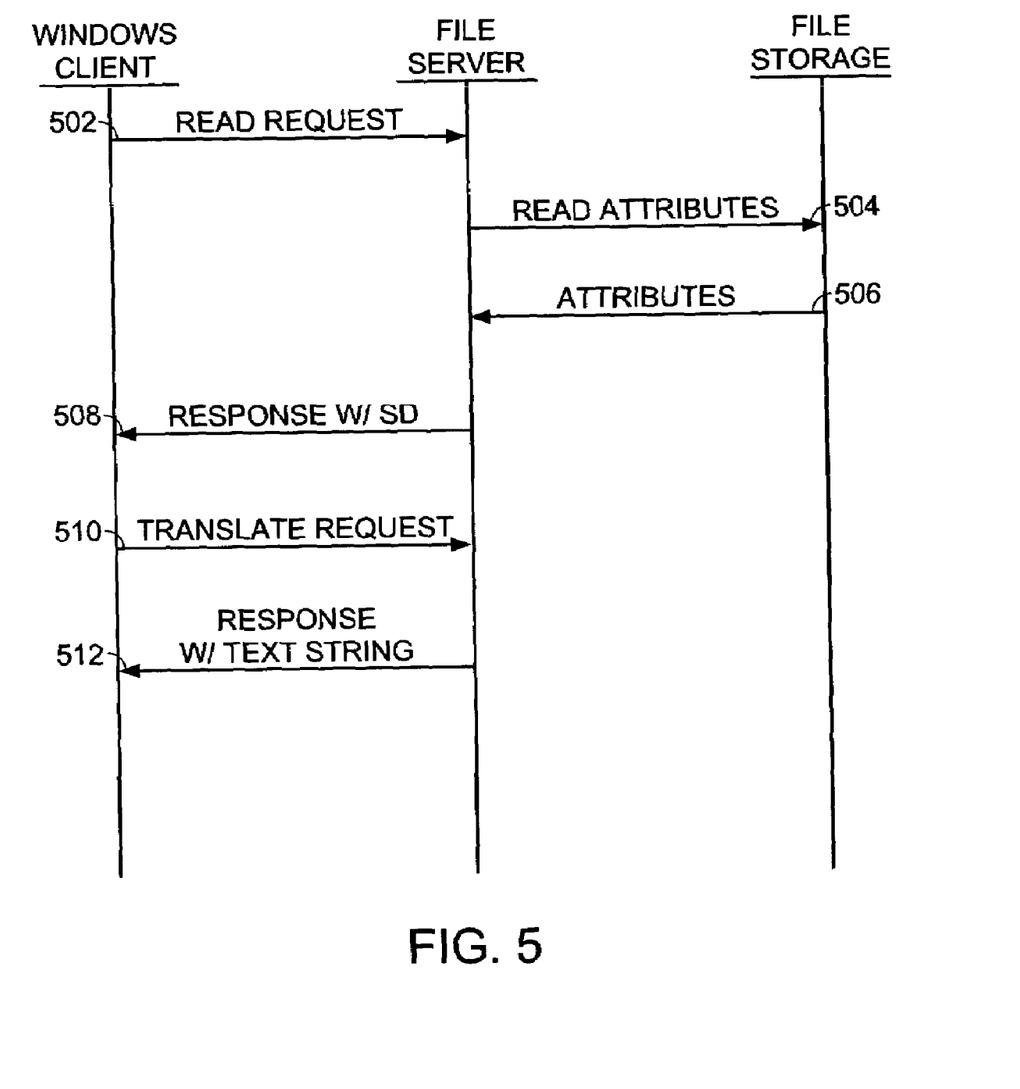
FIG. 5 is a message flow diagram showing exemplary message exchanges between a Windows client, the file server, and the file storage for reading file security attributes by a Windows client for a UNIX-secured file in accordance with an embodiment of the present invention.

FIG. 5 is a message flow diagram showing exemplary message exchanges between a Windows client 120, the file server 160, and the file storage 180 for reading file security attributes by a Windows client for a UNIX-secured file in accordance with an embodiment of the present invention. The Windows client 120 sends a request 502 to the file server 160 to read security attributes. The file server 160 sends a request 504 to the file storage 180 to read the file security attributes and receives the file security attributes 506 from the file storage 180. Assuming the file is a UNIX-secured file, the file server 160 generates an SD including an ACL generated from the UNIX file permissions and possibly including a UNIX-specific owner SID and/or a UNIX-specific group SID, as described above, and sends a response 508 to the Windows client 120 including the SD. If the SD includes a UNIX-specific SID, then the Windows client 120 sends a request 510 to the file server 160 to translate the UNIX-specific SID. The file server 160 sends a response 512 to the Windows client 120 including a text string generated from the UNIX-specific SID.

When a Windows client 120 sends a request to the file server 160 to modify the security attributes for a UNIX-secured file stored in the storage device 180, the file server 160 reads the UNIX file permissions, generates a Windows owner SID from the UNIX owner ID, generates a Windows group SID from the UNIX group ID, and generates a Windows ACL from the UNIX file permissions, substantially as discussed above. The file server 160 then generates a set of Windows file permissions for the file, specifically by merging the desired modifications to the security attributes with the Windows ACL generated from the UNIX file permissions. The file server 160 writes the set of Windows file permissions to the storage device 180 such that the file becomes a Windows-secured file.

Figure 6:
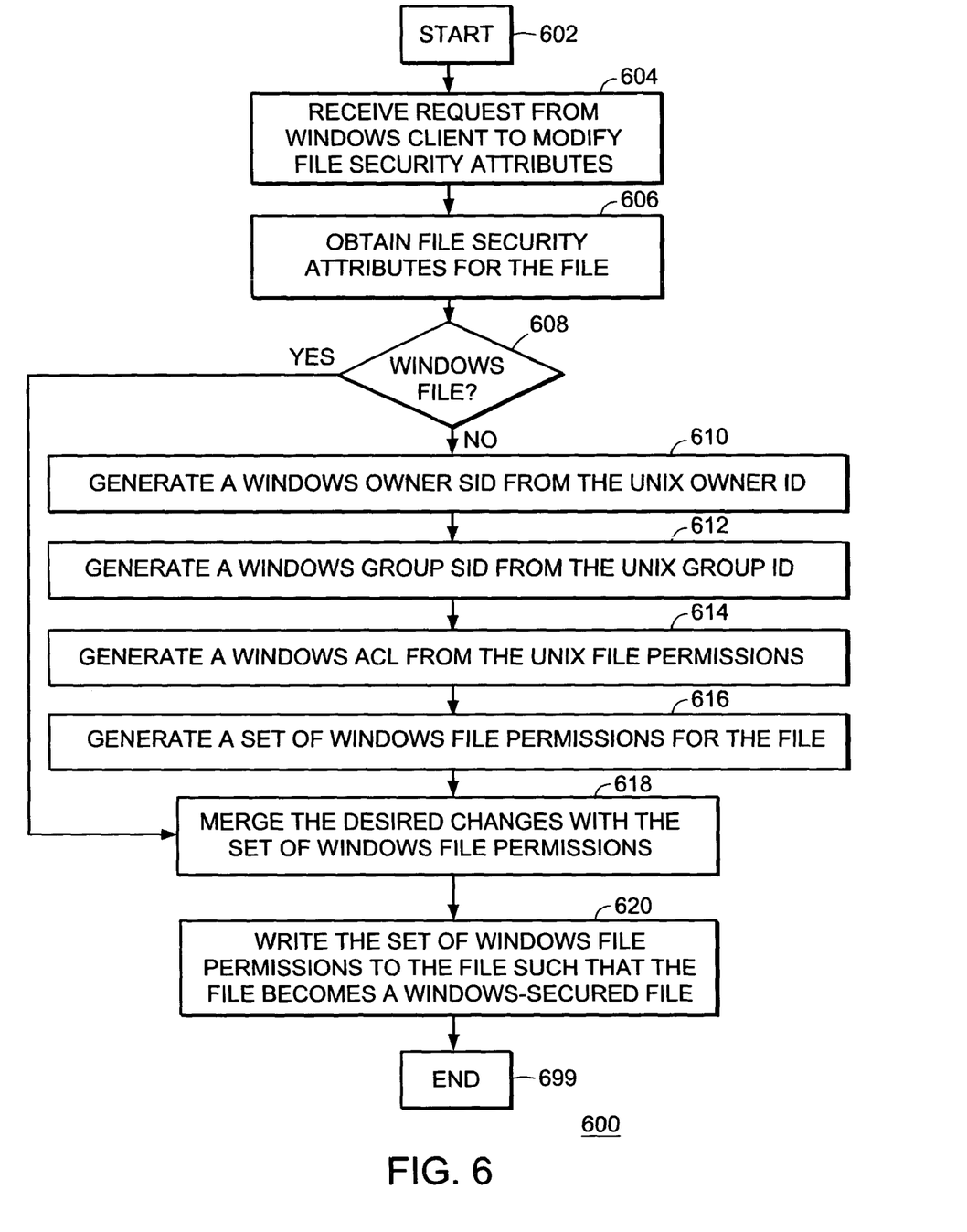
FIG. 6 is a logic flow diagram showing exemplary logic for modifying Windows file permissions for a UNIX-secured file in accordance with an embodiment of the present invention.

FIG. 6 is a logic flow diagram showing exemplary logic 600 for modifying Windows file permissions for a UNIX-secured file in accordance with an embodiment of the present invention. Beginning in block 602, and upon receiving a request from Windows client to modify file security attributes, in block 604, the logic obtains file security attributes for the file, in block 606. The logic then determines whether the file is a UNIX-secured file or a Windows-secured file, in block 608. If the file is a Windows-secured file (YES in block 608), then the logic proceeds to block 618. If, however, the file is a UNIX-secured file (NO in block 608), then the logic generates a Windows owner SID from the UNIX owner ID in block 610, generates a Windows group SID from the UNIX group ID in block 612, generates a Windows ACL from the UNIX file permissions, in block 614, generates a set of Windows file permissions, in block 616, and proceeds to block 618. In block 618, the logic merges the desired Windows file permissions with the set of Windows file permissions. The logic then stores the set of Windows file permissions to the file such that the file becomes a Windows-secured file, in block 620. The logic 600 terminates in block 699.

Figure 7:
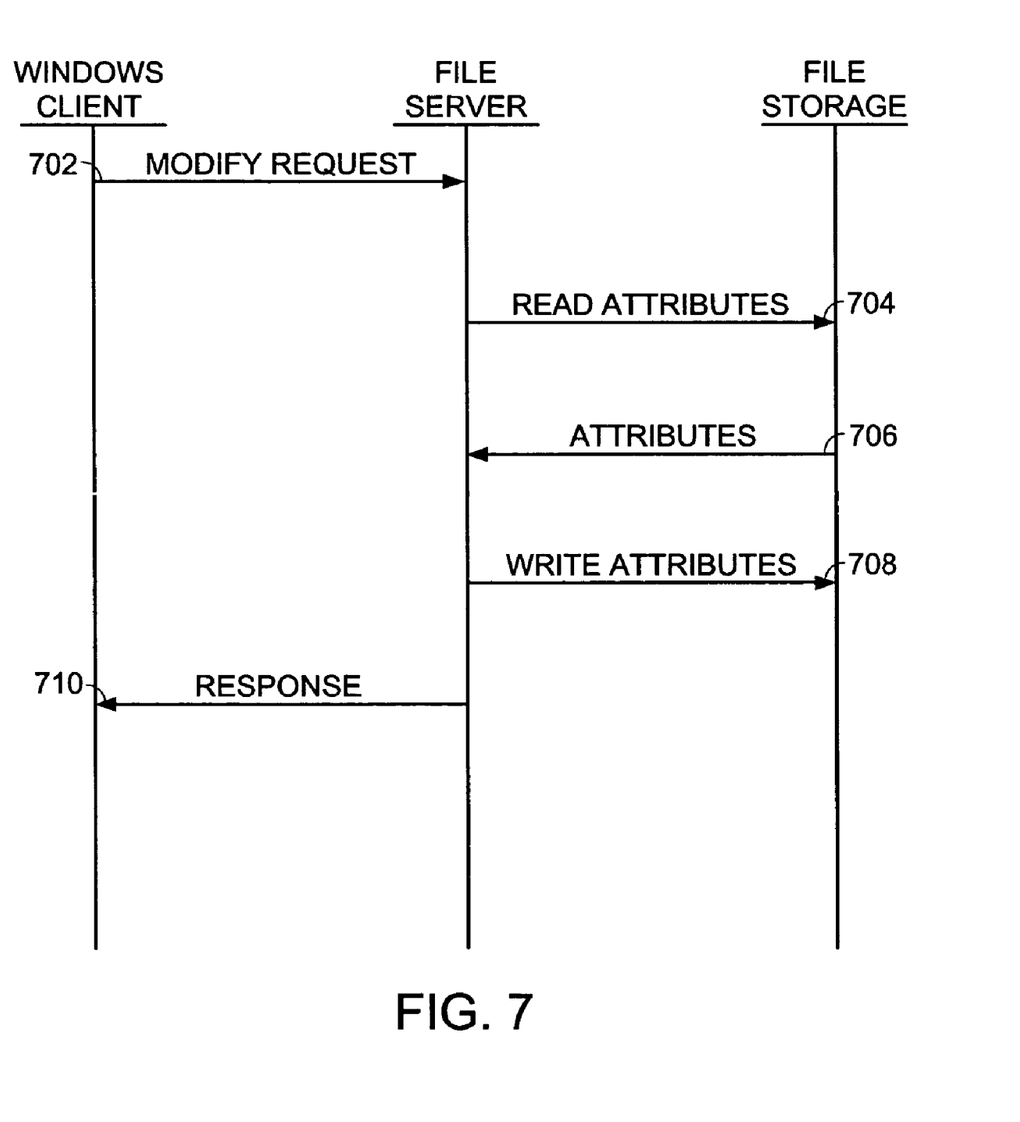
FIG. 7 is a message flow diagram showing exemplary message exchanges between a Windows client, the file server, and the file storage for modifying file security attributes by a Windows client for a UNIX-secured file in accordance with an embodiment of the present invention.

FIG. 7 is a message flow diagram showing exemplary message exchanges between a Windows client 120, the file server 160, and the file storage 180 for modifying file security attributes by a Windows client for a UNIX-secured file in accordance with an embodiment of the present invention. The Windows client 120 sends a request 702 to the file server 160 to modify security attributes. The file server 160 sends a request 704 to the file storage 180 to read the file security attributes and receives the file security attributes 706 from the file storage 180. Assuming the file is a UNIX-secured file, the file server 160 generates a set of Windows file permissions from the UNIX file permissions, merges the desired modifications with the set of Windows file permissions, and writes the set of Windows file permissions 708 to the storage device 180. The file server 160 sends a response 710 to the Windows client 120.

After converting the UNIX-secured file into a Windows-secured file, a Windows client can modify the file security attributes. If the Windows client modifies only the file permissions and not the form of the ACL, then the file server 160 can generally translate the Windows file security attributes perfectly into a set of UNIX file security attributes including the UNIX principals. Among other things, this quality makes it possible for a Windows user to fix the permissions of a file whose UNIX principals do not translate. Other systems typically either deny the Windows client access to fix the security or allow the Windows client to replace the security attributes so as to change the principals to Windows principals that may not translate to UNIX principals. This, then, allows Windows system administrators to non-disruptively fix permissions for their UNIX users, even on files that are not normally accessed from Windows and for which principal mappings have not been established.

Figure 8:
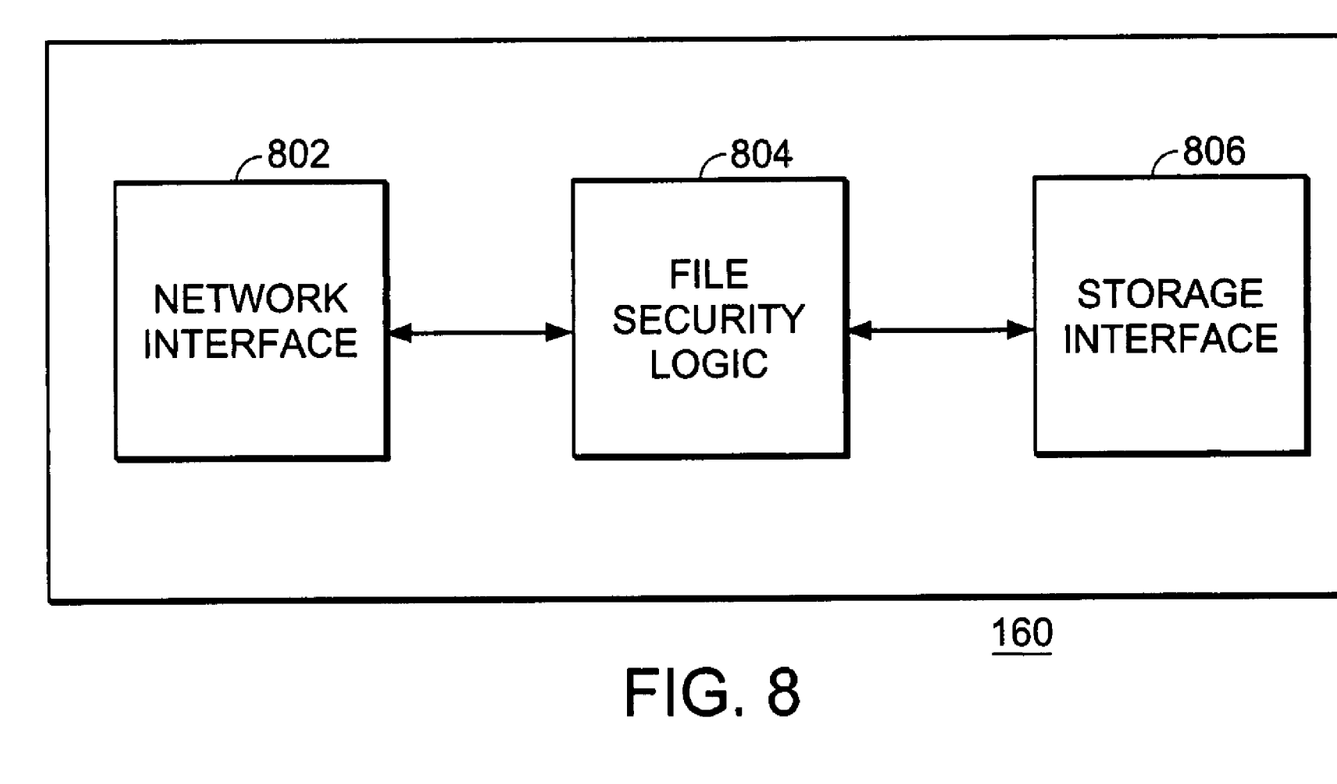
FIG. 8 is a schematic block diagram showing the relevant logic blocks of the file server for managing file security attributes in accordance with an embodiment of the present invention.

FIG. 8 is a schematic block diagram showing the relevant logic blocks of the file server 160 for managing file security attributes in accordance with an embodiment of the present invention. Among other things, the file server 160 includes a network interface 802 for communicating with various clients over the communication network 140, a storage interface 806 for communicating with the various storage devices, and file security logic 804 operating between the network interface 802 and the storage interface 806 for managing file security attributes as described above. The file security logic 804 performs such things as handling client requests, mapping between UNIX names and Windows names, generating and translating UNIX-specific SIDs, and translating UNIX file permissions into Windows file permissions.

While the UNIX-specific SID is preferably of the form "S-1-X-Y-Z," where X is a UNIX-specific authority identifier other than one of the well-known authority identifiers 0-5, Z is the UNIX identifier, and Y is an owner/group indicator having a first value for indicating that the UNIX identifier Z is the UNIX owner identifier and a second value for indicating that the UNIX identifier Z is the UNIX group identifier, it should be noted that the present invention is in no way limited to a SID of this form or to a SID of any particular form. The UNIX-specific SID can take on a variety of forms, so long as the UNIX identifier and at least one UNIX-specific indicator is included. Thus, for example, the UNIX-specific SID can alternatively be of the form:

S-1-X-Z where X is a UNIX-specific authority identifier having a first value for indicating that the UNIX identifier Z is the UNIX owner identifier and a second value for indicating that the UNIX identifier Z is the UNIX group identifier. For example, an embodiment of the present invention may use the value X=77 for indicating that the UNIX identifier Z is the UNIX owner identifier and the value X=78 for indicating that the UNIX identifier Z is the UNIX group identifier. Such an embodiment might generate the UNIX-specific SID "S-1-77-500" for UNIX owner identifier 500 and might generate the UNIX-specific SID "S-1-78-501" for UNIX group identifier 501. It should also be noted that the UNIX-specific SID is not limited to one with a UNIX-specific authority identifier, but rather the UNIX-specific SID could use one of the well-known authority identifier values, with the at least one UNIX-specific indicator and the UNIX identifier as qualifiers.

It should be noted that the term "server" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the logic flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the file server logic for generating Windows file permissions from UNIX file permissions is implemented as a set of computer program instructions that is converted into a computer executable form, stored as such in a computer readable medium, and executed by a microprocessor within the file server under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for managing file security attributes by a file server in a computer file storage system, the computer file storage system including a file secured using a first file security model, the method comprising:

receiving a first request from a client relating to the file stored in the computer file storage system, the client utilizing a second file security model;

retrieving a first set of file security attributes, in accordance with the first file security model, associated with the file, the first set of file security attributes including at least an owner identifier and a group identifier; and generating a second set of file security attributes, in accordance with the second file security model, from the first set of file security attributes, the second set of file security attributes including a plurality of security identifiers (SID) including at least an owner SID derived from the owner identifier and a group SID derived from the group identifier, wherein at least one of the owner SID and the group SID includes at least one map failure indicator and the corresponding identifier from the first set of file security attributes, wherein the map failure indicator indicates that said identifier relates to the first file security model.

2. A method according to claim 1, wherein the at least one map failure indicator includes an authority identifier, specific to the first file security model, and an owner/group indicator having a first value to indicate that the identifier is the owner identifier from the first set of security attributes, and a second value to indicate that the identifier is the group identifier from the first set of security attributes.

3. A method according to claim 1, wherein the at least one map failure indicator includes an authority identifier, specific to the first file security model, having a first value to indicate that the identifier is the owner identifier from the first set of file security attributes and a second value to indicate that the identifier is the group identifier from the first set of file security attributes.

4. A method according to claim 1, wherein generating the second set of file security attributes from the first set of file security attributes comprises:

attempting to map each identifier from the first set of file security attributes to a corresponding identifier from the second set of file security attributes; and generating, for each identifier from the first set of file security attributes that cannot be mapped to a corresponding identifier from the second set of file security attributes, the SID including the at least one map failure indicator and the corresponding identifier from the first set of file security attributes.

5. A method according to claim 4, wherein attempting to map each identifier from the first set of file security attributes to a corresponding identifier from the second set of file security attributes comprises:

maintaining a table mapping a first set of names in accordance with the first file security model to a second set of names in accordance with the second file security model;

determining a name from the first set of names corresponding to the identifier from the first set of file security attributes; and searching the table for a name from the second set of names corresponding to the name from the first set of names.

6. A method according to claim 5, wherein determining a name from the first set of names corresponding to the identifier from the first set of file security attributes comprises:

maintaining a cache mapping identifiers from the first set of file security attributes to names in the first set of names; and searching the cache for a name from the first set of names corresponding to the identifier from the first set of file security attributes.

7. A method according to claim 5, wherein determining a name from the first set of names corresponding to the identifier from the first set of file security attributes comprises:

sending the identifier from the first set of file security attributes over a communication link to a NIS server; and receiving the name from the first set of names over the communication link from the NIS server.

8. A method according to claim 1, further comprising:

transmitting the second set of file security attributes to the client in a response to the first request.

9. A method according to claim 8, further comprising:

receiving a second request from the client utilizing the second file security model including at least one of said SIDs including at least one map failure indicator and the corresponding identifier from the first set of file security attributes;

translating the at least one of said SIDs into a text string; and transmitting the text string to the client in a response to the second request.

10. A method according to claim 9, wherein the text string includes a representation of the identifier from the SID.

11. A method according to claim 1, wherein the first set of file security attributes includes a first set of file permissions, in accordance with the first file security model, and wherein generating the second set of file security attributes from the first set of file security attributes further comprises:

generating a second set of file permissions, in accordance with the second file security model, from the first set of file permissions.

12. A method according to claim 11, wherein the request comprises at least one requested change to the security attributes of the file, and wherein the method further comprises:

applying the requested security attribute changes to the second set of file security attributes to create a modified set of file security attributes in accordance with the second file security model; and writing the modified set of file security attributes to the file, said writing effectively changing the security model of the file from the first file security model to the second file security model.

13. A method according to claim 12, further comprising:

receiving a second request from a client utilizing the first file security model relating to the file, the second request associated with a session, the session having a session owner and a session group;

retrieving the modified set of file security attributes for the file; and providing the client with owner access to the file, if the owner SID in the modified set of file security attributes includes an owner identifier in accordance with the first file security model and the session owner matches the owner identifier in the owner SID.

14. A method according to claim 12, further comprising:

receiving a second request from a client utilizing the first file security model relating to the file, the second request associated with a session, the session having a session owner and a session group;

retrieving the modified set of file security attributes for the file; and providing the client with group access to the file, if the group SID in the modified set of file security attributes includes a group identifier in accordance with the first file security model and the session group matches the group identifier in the group SID.

15. A method according to claim 11, wherein generating the second set of file permissions from the first set of file permissions comprises:

translating the first set of file permissions into a second set of file permissions, the second set of file permissions defining owner permissions, group permissions, and everyone permissions;

removing any rights from the owner that the owner would be granted implicitly but are not granted to either the group or to everyone;

adding any rights that need to be explicitly denied to the owner and to the group;

producing a set of access control elements ordered hierarchically; and removing any redundant permissions from the access control elements.

16. An apparatus for managing file security attributes in a computer file storage system, the computer file storage system including a file secured using a first file security model, the file associated with a first set of file security attributes including an owner identifier and a group identifier, the apparatus comprising:

a network interface for communicating with clients over a communication network;

a storage interface for communicating with a file storage device; and file security logic operating between the network interface and the storage interface for managing file security attributes, the file security logic including logic for generating a second set of file security attributes, in accordance with a second file security model, from the first set of file security attributes, the second set of file security attributes including at least an owner SID derived from the owner identifier and a group SID derived from the group identifier, wherein at least one of the owner SID and the group SID includes at least one map failure indicator and the corresponding identifier from the first set of file security attributes, wherein the map failure indicator indicates that said identifier relates to the first file security model.

17. An apparatus according to claim 16, wherein the at least one map failure indicator includes an authority identifier, specific to the first security model, and an owner/group indicator having a first value to indicate that the identifier is the owner identifier from the first set of file security attributes and a second value to indicate that the identifier is the group identifier from the first set of file security attributes.

18. An apparatus according to claim 16, wherein the at least one map failure indicator includes an authority identifier, specific to the first file security model, having a first value to indicate that the identifier is the owner identifier from the first set of file security attributes and a second value to indicate that the identifier is the group identifier from the first set of file security attributes.

19. An apparatus according to claim 16, wherein the file security logic comprises:

logic for mapping each identifier from the first set of file security attributes to a corresponding identifier from the second set of file security attributes; and logic for generating, for each identifier from the first set of file security attributes that cannot be mapped to a corresponding identifier from the second set of file security attributes, the SID including the at least one map failure indicator and the corresponding identifier from the first set of file security attributes.

20. An apparatus according to claim 19, further comprising a table mapping a first set of names, in accordance with the first file security model, to a second set of names, in accordance with the second file security model, the file security logic determining a name from the first set of names corresponding to the identifier from the first set of file security attributes and searching the table for a name from the second set of names corresponding to the name from the first set of names for mapping each identifier from the first set of file security attributes to a corresponding identifier from the second set of file security attributes.

21. An apparatus according to claim 20, further comprising a cache mapping identifiers from the first set of file security attributes to names in the first set of names, the file security logic searching the cache for a name from the first set of names corresponding to the identifier from the first set of file security attributes for determining a name from the first set of names corresponding to the identifier from the first set of file security attributes.

22. An apparatus according to claim 20, wherein the file security logic sends the identifier from the first set of file security attributes over a communication link to a NIS server for determining a name from the first set of names corresponding to the identifier from the first set of file security attributes.

23. An apparatus according to claim 16, wherein the file security logic further comprises:

logic for translating the at least one of said SIDs into a text string.

24. An apparatus according to claim 23, wherein the text string includes a representation of the identifier from the SID.

25. An Apparatus according to claim 16, wherein the first set of file security attributes includes a first set of file permissions, in accordance with the first file security model, and wherein the file security logic further comprises:

logic for generating a second set of file permissions, in accordance with the second file security model, from the first set of file permissions.

26. An apparatus according to claim 25, wherein the file security logic includes logic for receiving a request from a client utilizing the second file security model, to modify file security attributes, applying the requested modifications to the second set of file permissions to create a modified set of file security attributes in accordance with the second file security model, and writing the modified set of file permissions to the storage device so as to effectively change the security model of the file from the first file security model to the second file security model.

27. An apparatus according to claim 25, wherein the file security logic includes logic for controlling access to the file using the second set of file permissions.

28. An apparatus according to claim 25, wherein the file security logic includes logic for translating the first set of file permissions into the second set of file permissions, the second set of file permissions defining owner permissions, group permissions, and everyone permissions; removing any rights from the owner that the owner would be granted implicitly but are not granted to either the group or to everyone; adding any rights that need to be explicitly denied to the owner and to the group; producing a set of access control elements ordered hierarchically; and removing any redundant permissions from the access control elements.

29. A method for generating, from a first set of file permissions in accordance with a first file security model, a second set of file permissions in accordance with a second file security model, the method comprising:

translating the first set of file permissions into the second set of file permissions, the second set of file permissions defining owner permissions, group permissions, and everyone permissions;

removing any rights from the owner that the owner would be granted implicitly but are not granted to either the group or to everyone;
adding any rights that need to be explicitly denied to the owner and to the group;
producing a set of access control elements ordered hierarchically; and
removing any redundant permissions from the access control elements.

30. A method according to claim 1, further comprising:
translating each SID including the at least one map failure indicator and the corresponding identifier into a text string.

31. A method according to claim 30, wherein the text string includes a representation of the identifier from the SID.

* * * * *